US 9,630,237 B2

(12) United States Patent
Kimura et al.

(10) Patent No.: US 9,630,237 B2
(45) Date of Patent: Apr. 25, 2017

(54) FACE SPLINE MOLDING DEVICE, FACE SPLINE MOLDING METHOD, OUTER JOINT MEMBER, AND CONSTANT VELOCITY UNIVERSAL JOINT

(75) Inventors: Takahiro Kimura, Kuwana (JP); Hiroshi Matsunaga, Iwata (JP)

(73) Assignee: NTN CORPORATION, Osaka (JP)

( * ) Notice: Subject to any disclaimer, the term of this patent is extended or adjusted under 35 U.S.C. 154(b) by 293 days.

(21) Appl. No.: 14/124,838

(22) PCT Filed: May 23, 2012

(86) PCT No.: PCT/JP2012/063184
§ 371 (c)(1),
(2), (4) Date: Dec. 9, 2013

(87) PCT Pub. No.: WO2012/172942
PCT Pub. Date: Dec. 20, 2012

(65) Prior Publication Data
US 2014/0100044 A1 Apr. 10, 2014

(30) Foreign Application Priority Data
Jun. 17, 2011 (JP) .................................. 2011-135425

(51) Int. Cl.
*B21J 9/02* (2006.01)
*B21H 5/02* (2006.01)
(Continued)

(52) U.S. Cl.
CPC ................ *B21H 5/02* (2013.01); *B21J 9/025* (2013.01); *B21K 1/30* (2013.01); *B21K 1/762* (2013.01);
(Continued)

(58) Field of Classification Search
CPC . B21H 5/02; B21H 5/00; B21K 1/765; B21K 1/762; B21K 1/30; F16D 3/18;
(Continued)

(56) References Cited

U.S. PATENT DOCUMENTS 1,142,782 A * 6/1915 Carlson .................... B21K 1/30
29/890.14
4,698,992 A * 10/1987 Bernet ..................... B21J 9/025
72/406
(Continued)

FOREIGN PATENT DOCUMENTS

CN 101031438 9/2007
JP 63-154240 6/1988
(Continued)

OTHER PUBLICATIONS

Chinese Office Action issued Jan. 7, 2015 in corresponding Chinese Patent Application No. 201280029580.6 with English translation.
(Continued)

*Primary Examiner* — Jimmy T Nguyen
*Assistant Examiner* — Peter Iannuzzi
(74) *Attorney, Agent, or Firm* — Wenderoth, Lind & Ponack, L.L.P.

(57) ABSTRACT

An outer joint member for a constant velocity universal joint is formed by a face spline forming apparatus and a face spline forming method. The face spline forming apparatus includes a punch member having a tooth portion for forming a face spline, a pedestal having an end-surface receiving surface for receiving an opening end surface of a cup section, and a shaft member having an inner-surface receiving surface for receiving a bottom-wall inner surface of the cup section. The opening end surface and the bottom-wall inner surface are brought into a simultaneous pressure receiving state. In this state, the punch member performs a
(Continued)

rocking motion to form the face spline in a bottom-wall back surface due to plastic deformation caused by the tooth portion of the punch member.

6 Claims, 9 Drawing Sheets

(51) Int. Cl.
  *B21K 1/30*     (2006.01)
  *B21K 1/76*     (2006.01)
  *F16D 3/223*    (2011.01)
  *F16D 3/18*     (2006.01)
  *B21H 5/00*     (2006.01)
  *B60B 27/00*    (2006.01)
  *F16D 1/076*    (2006.01)
(52) U.S. Cl.
  CPC ............ *B21K 1/765* (2013.01); *F16D 3/18*
       (2013.01); *F16D 3/223* (2013.01); *B21H 5/00*
         (2013.01); *B60B 27/0005* (2013.01); *B60B*
         *27/0026* (2013.01); *B60B 27/0042* (2013.01);
              *F16D 1/076* (2013.01); *F16D 2003/22326*
                (2013.01); *F16D 2250/0023* (2013.01)
(58) Field of Classification Search
  CPC ............ F16D 3/223; F16D 1/076; F16D
                  2003/22326; F16D 2250/0023; B21J
                  9/025; B60B 27/0026; B60B 27/0042;
                                        B60B 27/0005
  USPC .................................................... 72/67, 112
  See application file for complete search history.

(56) References Cited

U.S. PATENT DOCUMENTS

| 6,244,943 | B1* | 6/2001 | Bohler | B24B 11/00 |
| | | | | 451/294 |
| 6,276,180 | B1* | 8/2001 | Hirschvogel | B21J 9/025 |
| | | | | 72/115 |
| 7,536,892 | B2* | 5/2009 | Amino | B21D 22/16 |
| | | | | 72/115 |
| 7,832,940 | B2 | 11/2010 | Matsui et al. | |
| 2008/0118197 | A1* | 5/2008 | Matsui | B21J 9/025 |
| | | | | 384/494 |
| 2009/0154856 | A1* | 6/2009 | Kubota | B60B 27/00 |
| | | | | 384/510 |
| 2009/0261647 | A1* | 10/2009 | Kamikawa | B60B 27/0005 |
| | | | | 301/110 |
| 2011/0061238 | A1* | 3/2011 | Sera | B21D 39/00 |
| | | | | 29/898.04 |
| 2013/0040161 | A1* | 2/2013 | Gerlach | B21J 5/08 |
| | | | | 428/603 |
| 2013/0181375 | A1* | 7/2013 | Ferrero | B21K 21/12 |
| | | | | 264/293 |

FOREIGN PATENT DOCUMENTS

| JP | 63-184501 | 7/1988 |
| JP | 2001-162338 | 6/2001 |
| JP | 2002-339959 | 11/2002 |
| JP | 2006-153171 | 6/2006 |
| JP | 2009-274515 | 11/2009 |

OTHER PUBLICATIONS

International Search Report issued Aug. 21, 2012 in International (PCT) Application No. PCT/JP2012/063184.

International Preliminary Report on Patentability and Written Opinion of the International Searching Authority issued Jan. 3, 2014 in International (PCT) Application No. PCT/JP2012/063184.

* cited by examiner

ORBITAL FORMING PROCESS

US 9,630,237 B2

FACE SPLINE MOLDING DEVICE, FACE SPLINE MOLDING METHOD, OUTER JOINT MEMBER, AND CONSTANT VELOCITY UNIVERSAL JOINT

TECHNICAL FIELD

The present invention relates to a face spline forming apparatus, a face spline forming method, an outer joint member, and a constant velocity universal joint.

BACKGROUND ART

In recent years, as a wheel bearing device (drive wheel bearing device), there has been known a wheel bearing device including a hub wheel, a double row rolling bearing, and a constant velocity universal joint that are provided as a unit. That is, as illustrated in FIG. 11, this wheel bearing device includes a hub wheel 102 having a flange 101 extending in a radially outer direction, a constant velocity universal joint 104 having an outer joint member 103 fixed to the hub wheel 102, and a rolling bearing 100 arranged on an outer circumferential side of the hub wheel 102.

The constant velocity universal joint 104 includes the outer joint member 103, an inner joint member 108 arranged in a bowl-like section (cup section) 107 of the outer joint member 103, balls 109 arranged between the inner joint member 108 and the outer joint member 103, and a cage 110 for holding the balls 109. Further, a spline portion 111 is formed in an inner circumferential surface of a center hole of the inner joint member 108, and a spline portion provided at an end portion of a shaft (not shown) is inserted into the center hole so that the spline portion 111 on the inner joint member 108 side and the spline portion on the shaft side engage with each other.

Further, the hub wheel 102 includes a cylinder section 113 and the flange 101. A pilot section 115 having a shape of a short cylinder is provided in a projecting manner on an outer end surface 114 of the flange 101 (end surface located opposite to the joint), and a wheel (not shown) and a brake rotor (not shown) are mounted to the pilot section 115.

Further, a cutout portion 116 is provided in an outer circumferential surface of an end portion of the cylinder section 113 on the cup section 107 side, and an inner race 117 is fitted to the cutout portion 116 so as to form an inner member of the rolling bearing 100. A first inner raceway surface 118 is provided in the outer circumferential surface of the cylinder section 113 of the hub wheel 102 at a position in the vicinity of the flange, and a second inner raceway surface 119 is provided in an outer circumferential surface of the inner race 117. Note that, bolt insertion holes 112 are provided in the flange 101 of the hub wheel 102, and hub bolts are inserted into the bolt insertion holes 112, respectively, so as to fix the wheel and the brake rotor to the flange 101.

An outer member 105 of the rolling bearing 100 has double row outer raceway surfaces 120 and 121 provided on an inner circumference thereof. The first outer raceway surface 120 of the outer member 105 is opposed to the first inner raceway surface 118 of the hub wheel 102, and the second outer raceway surface 121 of the outer member 105 is opposed to the raceway surface 119 of the inner race 117. Rolling elements 122 are interposed between those opposing surfaces.

A partition wall 124 is provided on the cylinder section 113 of the hub wheel 102, and a coupling bolt member 125 is inserted into a through hole 124a of the partition wall 124. Further, a screw hole 127 is provided in a bottom wall 126 of the cup section 107, and the bolt member 125 is threadedly inserted into the screw hole 127.

Conventionally, there is known a torque transmitting structure formed of a face spline structure, in which a face spline 128 is provided in a surface of the bottom wall 126 of the cup section 107 that is opposed to the hub wheel (back surface), and a face spline 129 is provided in a surface of the cylinder section 113 of the hub wheel 102 that is opposed to the bowl-like section (Patent Literature 1). In this case, in each of the face splines 128 and 129, a plurality of projecting threads extending in a radial direction and a plurality of depressed threads extending in the radial direction are alternately arranged along a circumferential direction.

In the face spline structure as described above, there are attained such advantages that torque can be transmitted without a backlash, that stick-slip noise can be suppressed between the surface opposed to the hub wheel and the surface opposed to the bowl-like section, that the easiness of assembly is excellent, and that the light-weighting can be achieved.

By the way, to form the face spline as described above, there is known an apparatus that includes a punch having a tooth profile (tooth portion) formed therein for performing plastic working of the face spline, and a rockshaft having a center axis inclined at a predetermined angle, and is configured to form the face spline due to plastic deformation caused by rocking motion of the rockshaft (Patent Literature 2).

CITATION LIST

Patent Literature 1: JP 63-184501 A
Patent Literature 2: JP 2009-274515 A

SUMMARY OF INVENTION

Technical Problem

In the case of forming the face spline in the back surface of the bottom wall of the outer joint member through use of the forming apparatus disclosed in Patent Literature 2 or the like, an opening end surface of the cup section and a bottom-wall inner surface of the cup section need to be received by a receiving member. That is, the opening end surface and the bottom-wall inner surface are received from the lower side, and the rockshaft is caused to perform the rocking motion so as to press the punch against the back surface of the bottom wall of the cup section.

However, due to fluctuation in axial dimension inside the cup section, the pressure may be received only by the bottom-wall inner surface of the cup section, or by the opening end surface of the cup section. In this case, the workpiece to be processed (outer joint member) is plastically deformed under an unstable state. Therefore, the inner portion of the cup section is deformed.

When the pressure is received only by the bottom-wall inner surface of the cup section, the workpiece (outer joint member) becomes unsteady during the orbital forming process, and an outer surface of the cup is locally brought into contact with the member that receives the opening end surface of the cup, with the result that the inner diameter of the cup section may be reduced. Further, when the pressure is received only by the opening end surface of the cup section, the bottom-wall inner surface of the cup section is not received, and hence the bottom-wall inner surface of the cup section is deformed. Then, a plastic flow into the cup section is generated, with the result that the inner diameter of the cup section may be reduced.

In view of the above-mentioned circumstances, the present invention provides a face spline forming apparatus and a face spline forming method, with which fluctuation of an inner diameter of a cup section of an outer joint member can be suppressed and a face spline can be formed stably. Further, the present invention provides an outer joint member formed by the face spline forming apparatus and the face spline forming method, and a constant velocity universal joint using the outer joint member thus formed.

Solution to Problem

According to one embodiment of the present invention, there is provided a face spline forming apparatus for forming a face spline in a bottom-wall back surface of an outer joint member of a constant velocity universal joint, the face spline forming apparatus comprising: a punch member having a tooth portion for forming the face spline, and having an axial center inclined at a predetermined angle with respect to an axial center of the outer joint member; a pedestal having an end-surface receiving surface for receiving an opening end surface of a cup section of the outer joint member; a shaft member for receiving a bottom-wall inner surface of the cup section of the outer joint member; a movement mechanism for shifting the pedestal and the shaft member relative to each other in an axial direction thereof; and control means for controlling the movement mechanism so that a pressure is simultaneously receivable by the opening end surface of the cup section and the bottom-wall inner surface of the cup section, in which, at the time of receiving the pressure simultaneously, the punch member is configured to perform rocking motion through rotation of the punch member about the axial center of the outer joint member, to thereby form the face spline in the bottom-wall back surface due to plastic deformation caused by the tooth portion of the punch member.

According to the face spline forming apparatus of the present invention, the pedestal and the shaft member are shifted relative to each other in the axial direction, and hence the opening end surface of the cup section and the bottom-wall inner surface of the cup section can receive a pressure simultaneously. Therefore, even when the axial dimension inside the cup section fluctuates, the bottom-wall back surface can be plastically deformed by the tooth portion of the punch member under the simultaneous pressure receiving state.

The pedestal and the shaft member may be shifted relative to each other in the axial direction by the control means through movement of the shaft member in the axial direction. Further, the movement mechanism may be constructed of a screw structure or a servomechanism using a servomotor.

According to one embodiment of the present invention, there is provided a face spline forming method for forming a face spline in a bottom-wall back surface of an outer joint member through use of a face spline forming apparatus, the face spline forming apparatus comprising: a punch member having a tooth portion for forming the face spline, and having an axial center inclined at a predetermined angle with respect to an axial center of the outer joint member; a pedestal having an end-surface receiving surface for receiving an opening end surface of a cup section of the outer joint member; and a shaft member having an inner-surface receiving surface for receiving a bottom-wall inner surface of the cup section of the outer joint member, the face spline forming method comprising: attaining a simultaneous pressure receiving state of the opening end surface of the cup section and the bottom-wall inner surface of the cup section; and performing, after attaining the simultaneous pressure receiving state, rocking motion of the punch member through rotation of the punch member about the axial center of the outer joint member while maintaining the simultaneous pressure receiving state, to thereby form the face spline in the bottom-wall back surface due to plastic deformation caused by the tooth portion of the punch member.

According to the face spline forming method of the present invention, even when the axial dimension inside the cup section fluctuates, the bottom-wall back surface can be plastically deformed by the tooth portion of the punch member under the simultaneous pressure receiving state while suppressing deformation inside the cup section.

With respect to a state in which the pedestal receives the opening end surface of the cup section, the pedestal and the shaft member may be shifted relative to each other in the axial direction to attain a state in which the shaft member receives the bottom-wall inner surface of the cup section. In this manner, there can be attained the simultaneous pressure receiving state of the opening end surface of the cup section and the bottom-wall inner surface of the cup section at the time of the rocking motion of the punch member.

In this case, it is preferred that the following expression be established: $P1=S1 \cdot P/(S1+S2)$, where $S1$ represents a pressure receiving area of the bottom-wall inner surface of the cup section, $S2$ represents a pressure receiving area of the opening end surface of the cup section, P represents a forming load at the time of the plastic deformation, and $P1$ represents a load to be applied to the bottom-wall inner surface of the cup section. Thus, the simultaneous pressure receiving state can be attained effectively.

Further, with respect to a state in which the shaft member receives the bottom-wall inner surface of the cup section, the pedestal and the shaft member may be shifted relative to each other in the axial direction to attain a state in which the pedestal receives the opening end surface of the cup section. In this manner, there can be attained the simultaneous pressure receiving state of the opening end surface of the cup section and the bottom-wall inner surface of the cup section at the time of the rocking motion of the punch member.

In this case, it is preferred that the following expression be established: $P2=S2 \cdot P/(S1+S2)$, where $S1$ represents a pressure receiving area of the bottom-wall inner surface of the cup section, $S2$ represents a pressure receiving area of the opening end surface of the cup section, P represents a forming load at the time of the plastic deformation, and $P2$ represents a load to be applied to the opening end surface of the cup section. Thus, the simultaneous pressure receiving state can be attained effectively.

A first outer joint member of a constant velocity universal joint of the present invention comprises a face spline formed in a bottom-wall back surface thereof through use of the face spline forming apparatus.

A second outer joint member of a constant velocity universal joint of the present invention comprises a face spline formed in a bottom-wall back surface thereof through use of the face spline forming method.

A constant velocity universal joint of the present invention comprises: the outer joint member; an inner joint member; and a torque transmitting member interposed between the outer joint member and the inner joint member.

Advantageous Effects of Invention

In the face spline forming apparatus of the present invention, even when the axial dimension inside the cup section fluctuates, the bottom-wall back surface can be plastically deformed by the tooth portion of the punch member under the simultaneous pressure receiving state. Therefore, the face spline can be formed stably while suppressing the fluctuation of the inner diameter of the cup section.

As long as the relative axial shift of the pedestal and the shaft member by the control means is carried out through the axial movement of the shaft member, and the movement mechanism for the axial movement of the shaft member is constructed of a screw structure, the movement mechanism can be constructed of a simple structure, and thus the cost can be reduced. Further, as long as the relative axial shift of the pedestal and the shaft member by the control means is carried out through the axial movement of the shaft member, and the movement mechanism for the axial movement of the shaft member is constructed of a servomechanism using a servomotor, there are attained advantages of high accuracy with respect to the target value, a wide speed range, quick response, and the like.

In the face spline forming method of the present invention, the load to be applied to the bottom-wall inner surface of the cup section and the load to be applied to the opening end surface of the cup section are controlled. As a result, the fluctuation of the inner diameter of the cup section can be suppressed stably, and a high-quality product can be provided.

Therefore, the outer joint member having the face spline formed therein by the face spline forming apparatus and the face spline forming method described above is a high-quality outer joint member with a small fluctuation of the inner diameter of the cup section. Further, the constant velocity universal joint using the outer joint member as described above is a constant velocity universal joint that can effectively take advantage of the face spline structure.

DESCRIPTION OF EMBODIMENTS

Now, embodiments of the present invention are described with reference to the drawings.

Figure 3:
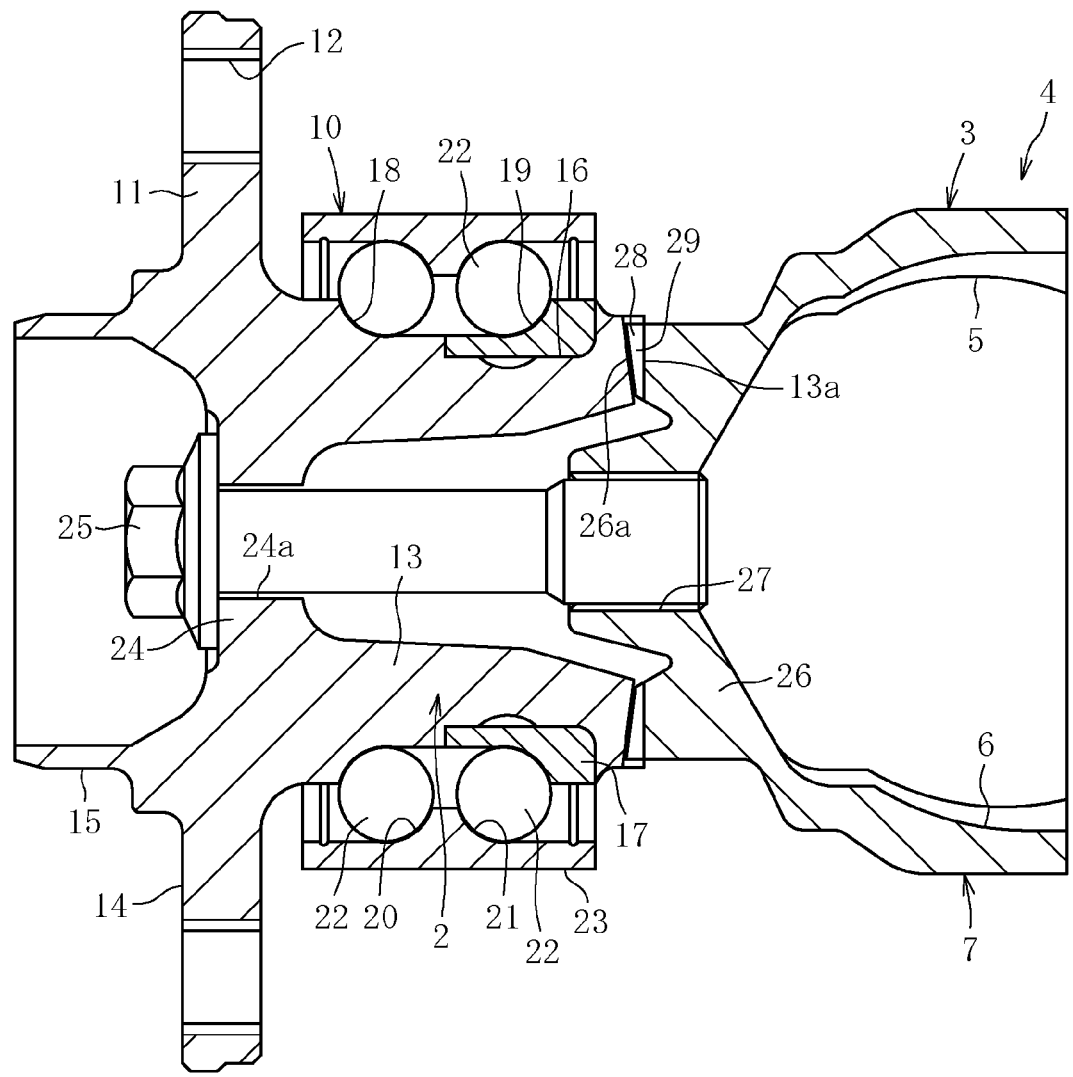
FIG. 3 is a sectional view of a wheel bearing device using an outer joint member having a face spline formed by the face spline forming apparatus.

FIG. 3 illustrates a wheel bearing device using a constant velocity universal joint according to the present invention. The wheel bearing device comprises a hub wheel 2 having a flange 11 extending in a radially outer direction, a constant velocity universal joint 4 having an outer joint member 3 fixed to the hub wheel 2, and a rolling bearing 10 arranged on an outer circumferential side of the hub wheel 2. The outer joint member 3 comprises a cup section 7 having a plurality of track grooves 6 formed in an inner surface 5 thereof.

The constant velocity universal joint 4 comprises the outer joint member 3, an inner joint member (not shown) arranged in the cup section 7 of the outer joint member 3, balls (not shown) serving as a torque transmitting member arranged between the inner joint member and the outer joint member 3, and a cage (not shown) for holding the balls.

Further, the hub wheel 2 comprises a cylinder section 13 and the flange 11. A pilot section 15 having a shape of a short cylinder is provided in a projecting manner on an outer end surface 14 of the flange 11 (end surface located opposite to the joint), and a wheel (not shown) and a brake rotor (not shown) are mounted to the pilot section 15.

Further, a cutout portion 16 is provided in an outer circumferential surface of an end portion of the cylinder section 13 on the cup section 7 side, and an inner race 17 is fitted to the cutout portion 16 so as to form a part of an inner member of the rolling bearing 10. A first inner raceway surface 18 is provided in the outer circumferential surface of the cylinder section 13 of the hub wheel 2 at a position in the vicinity of the flange, and a second inner raceway surface 19 is provided in an outer circumferential surface of the inner race 17. In this manner, the inner member of the rolling bearing 10 is formed of a part of the cylinder section 13 of the hub wheel 2 and the inner race 17. Note that, bolt insertion holes 12 are provided in the flange 11 of the hub wheel 2, and hub bolts are inserted into the bolt insertion holes 12, respectively, so as to fix the wheel and the brake rotor to the flange 11.

An outer member 23 of the rolling bearing 10 has double row outer raceway surfaces 20 and 21 provided on an inner circumference thereof. The first outer raceway surface 20 of the outer member 23 is opposed to the first inner raceway surface 18 of the hub wheel 2, and the second outer raceway surface 21 of the outer member 5 is opposed to the raceway surface 19 of the inner race 17. Rolling elements 22 are interposed between those opposing surfaces.

A partition wall 24 is provided on the cylinder section 13 of the hub wheel 2, and a coupling bolt member 25 is inserted into a through hole 24a of the partition wall 24. Further, a screw hole 27 is provided in a bottom wall 26 of the cup section 7, and the bolt member 25 is threadedly inserted into the screw hole 27.

Figure 4:
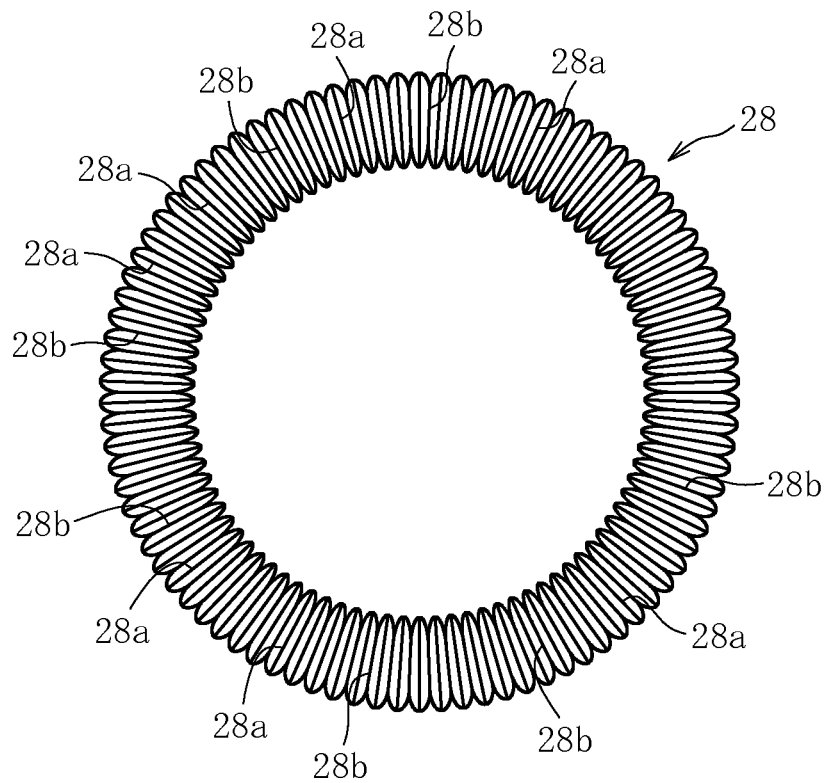
FIG. 4 is a front view of the face spline.

A face spline 28 is provided in a back surface 26a of the bottom wall 26 of the cup section 7, and a face spline 29 meshing with the face spline 28 is provided in an end surface 13a of the cylinder section 13 of the hub wheel 2. As illustrated in FIG. 4, in the face spline 28, a plurality of projecting threads 28a extending in a radial direction and a plurality of depressed threads 28b extending in the radial direction are alternately arranged along a circumferential direction. Similarly, in the face spline 29, a plurality of projecting threads extending in the radial direction and a plurality of depressed threads extending in the radial direction are alternately arranged along the circumferential direction.

Figure 1:
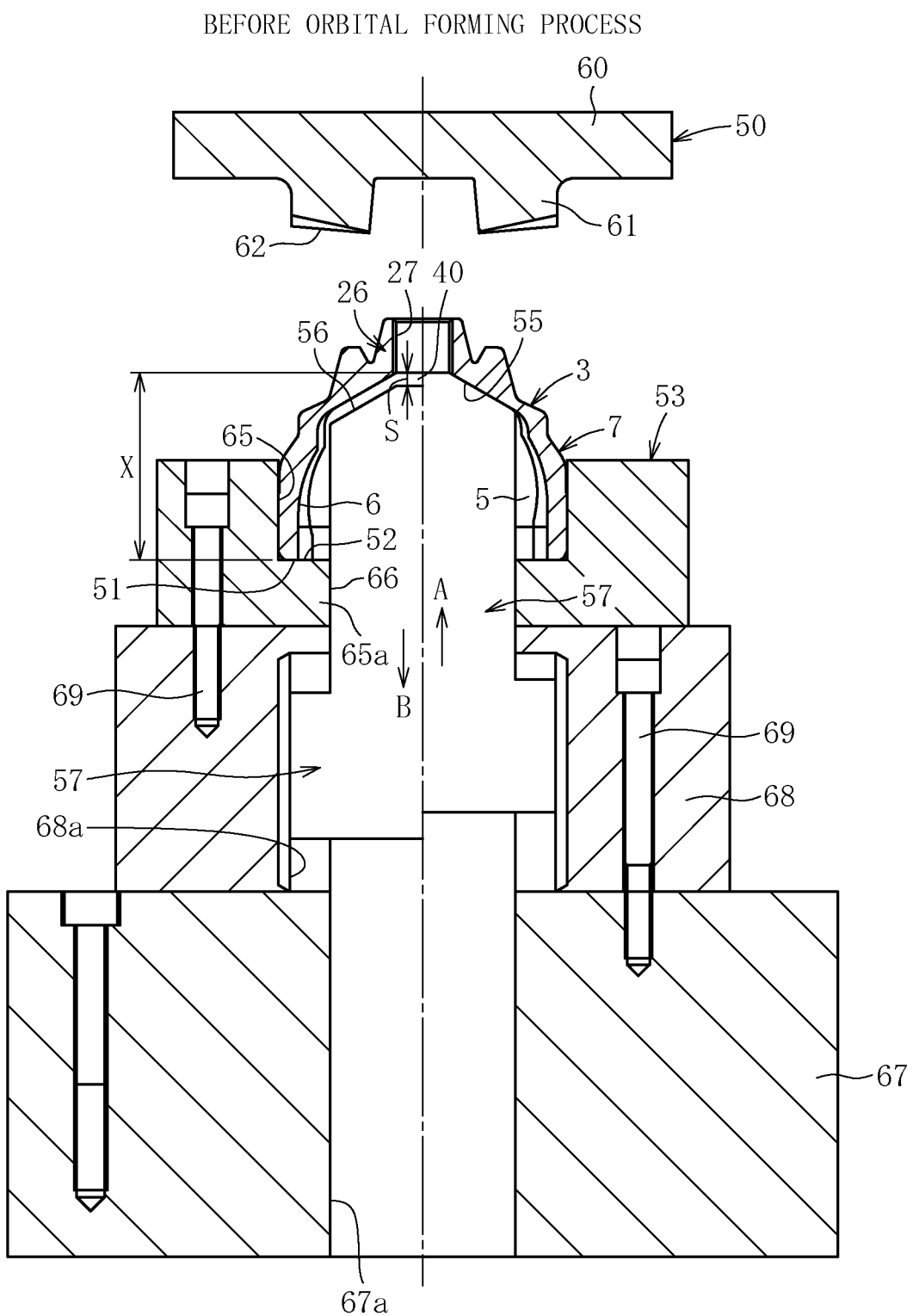
FIG. 1 is a sectional view of a face spline forming apparatus before a forming process according to an embodiment of the present invention.
Figure 2:
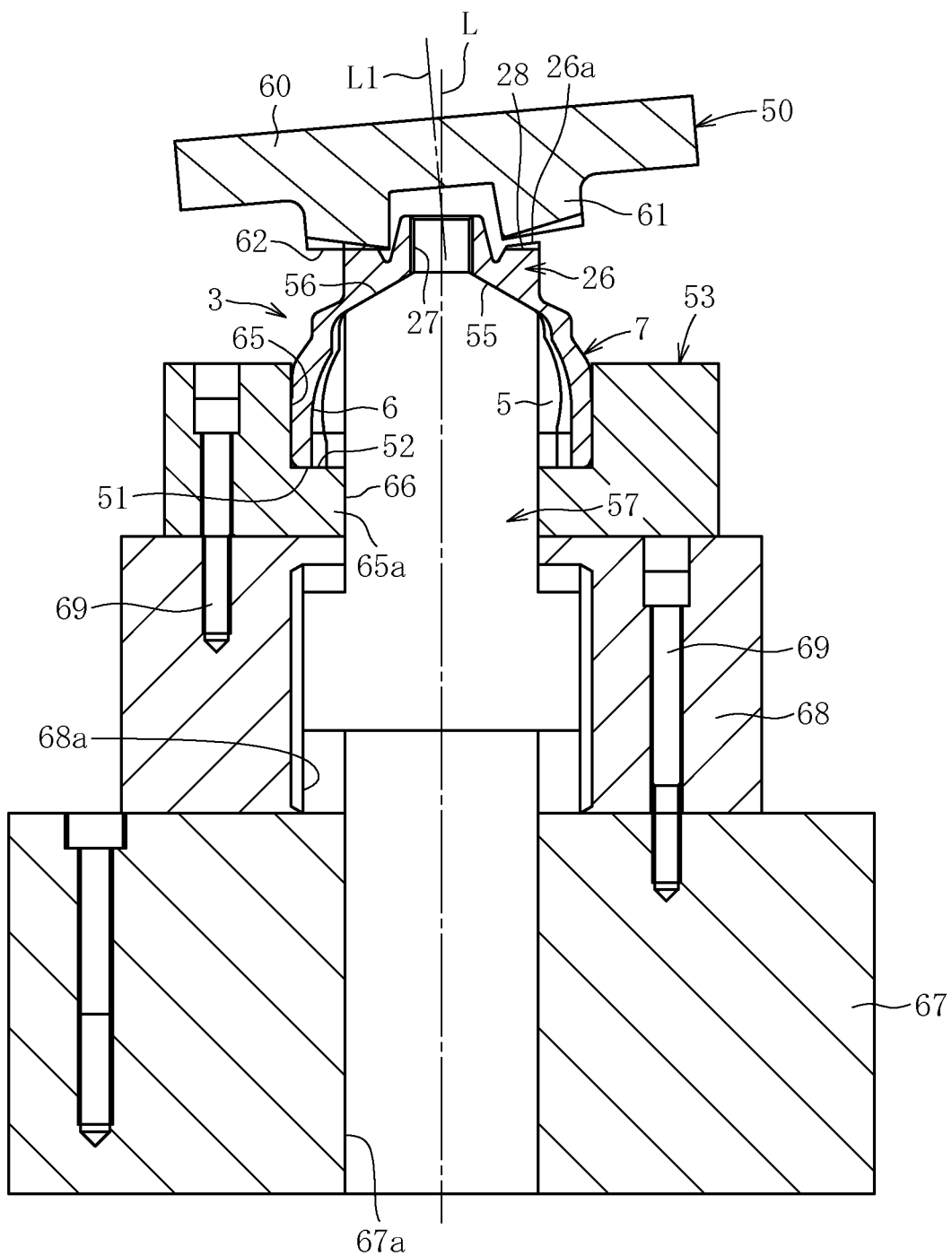
FIG. 2 is a sectional view of the face spline forming apparatus during the forming process.

FIG. 1 illustrates a face spline forming apparatus for forming the face spline 28 in the back surface 26a of the bottom wall 26 of the cup section 7. The face spline forming apparatus comprises a punch member 50 having an axial center inclined at a predetermined angle with respect to an axial center of the outer joint member 3 as illustrated in FIG. 2, a pedestal 53 having an end-surface receiving surface 52 for receiving an opening end surface 51 of the cup section 7 of the outer joint member 3, and a shaft member 57 having an inner-surface receiving surface 56 for receiving a bottom-wall inner surface 55 of the cup section 7 of the outer joint member 3. The shaft member 57 is reciprocable in directions indicated by the arrows A and B along a direction of an axial center thereof.

The punch member 50 comprises a base plate 60, and an annular section 61 provided on a lower surface of the base plate 60. A tooth portion (tooth profile) 62 for forming the face spline is provided on a lower surface of the annular section 61. Further, the punch member 50 is mounted to a rotation shaft (not shown).

The pedestal 53 is formed of a block member provided with a depressed portion 65. Further, a through hole 66 is provided in a bottom wall 65a of the depressed portion 65. In this case, an inner surface of the depressed portion 65 corresponds to an outer surface of the cup section 7 of the outer joint member 3, in which the face spline 28 is to be formed. That is, as illustrated in FIG. 1, the cup section 7 is fitted to the depressed portion 65 under a state in which the opening portion thereof is opened downward, and the opening end surface 51 of the cup section 7 is received by the end-surface receiving surface 52, which is an inner surface of the bottom wall 65a of the depressed portion 65. Under this fitting state, a part of the cup section 7 corresponding substantially to a half of its axial length on the opening side is fitted into the depressed portion 65. Further, the rotation of the outer joint member 3 about the axial center thereof is restricted.

The pedestal 53 is placed on and fixed to a base 67 through an intermediation of a support base 68. That is, the base 67 is formed of a block member having an axial center hole 67a, and the support base 68 is formed of a block member having an axial center hole 68a that is larger in diameter than the axial center hole 67a, and is fixed to the base 67 through an intermediation of a bolt member 69. Further, the pedestal 53 is fixed to the support base 68 through an intermediation of another bolt member 69.

The shaft member 57 has its distal end serving as the inner-surface receiving surface 56 having a shape conforming to the shape of the bottom-wall inner surface 55 of the cup section 7 of the outer joint member 3, in which the face spline 28 is to be formed. In this case, the screw hole 27 is provided in the bottom wall 26, and hence the distal end portion of the shaft member 57 is formed into a shape of a flat truncated cone. The inner-surface receiving surface 56 is formed of a circumferential surface of the flat truncated cone.

Figure 5:
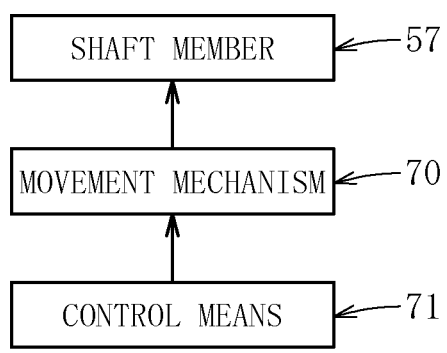
FIG. 5 is a block diagram of a configuration of a control unit of the face spline forming apparatus.

The shaft member 57 is vertically movable by a movement mechanism 70 (see FIG. 5). The movement mechanism 70 comprises, for example, a screw shaft and a nut member threadedly engaging with the screw shaft. That is, the nut member is rotated about an axial center thereof so that the screw shaft can be moved in a direction of an axial center thereof. In this case, a ball screw mechanism is preferred. Further, a servomechanism using a servomotor may be used as the movement mechanism 70. That is, it is only necessary that, in the ball screw mechanism, the nut member be driven to rotate by the servomotor.

By the way, the movement mechanism 70 is controlled by control means 71. The control means 71 may be constructed of a microcomputer or the like, and is configured to control the amount of axial movement of the shaft member 57.

Figure 6:
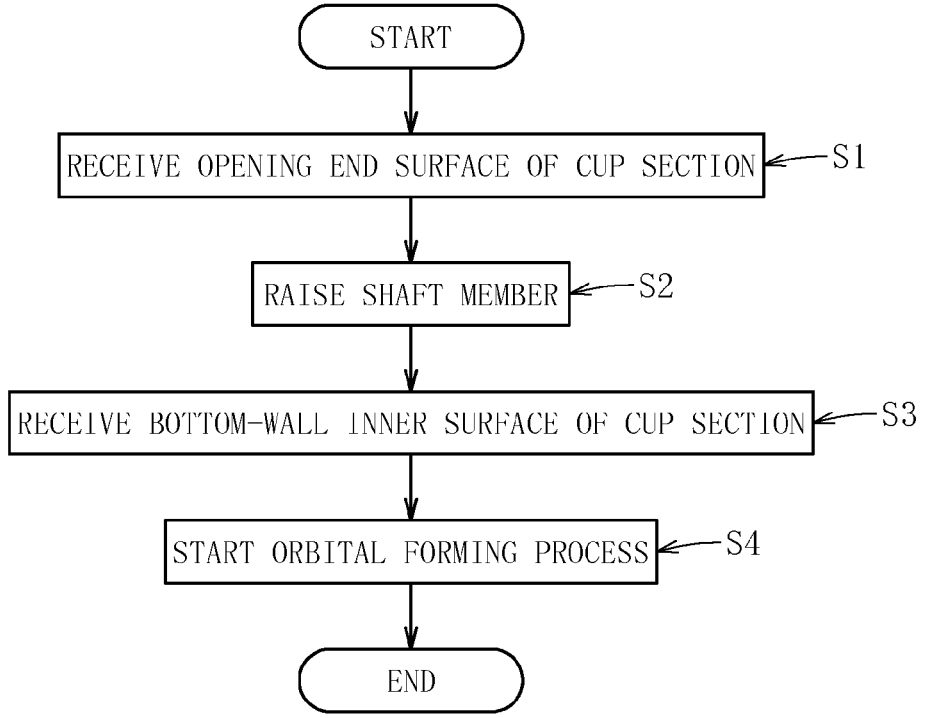
FIG. 6 is a flow chart of a face spline forming method using the face spline forming apparatus.

Next, referring to the flow charts of FIG. 6 and the like, description is given of a face spline forming method using the face spline forming apparatus that is constructed as described above. First, the opening end surface 51 of the cup section 7 is brought into a state of being received by the end-surface receiving surface 52 of the pedestal 53 (Step S1). That is, the cup section 7 of the outer joint member 3 is fitted to the depressed portion 65 of the pedestal 53 so that the opening portion thereof is opened downward. Under this state, as illustrated in the left half of the drawing sheet of FIG. 1, a gap 40 is provided between the inner-surface receiving surface 56 of the shaft member 57 and the bottom-wall inner surface 55 of the cup section 7.

Subsequently, the shaft member 57 is raised in the direction indicated by the arrow A along the direction of the axial center thereof by an amount corresponding to a dimension S for eliminating the gap 40 (Step S2). Then, the inner-surface receiving surface 56 of the shaft member 57 is brought into contact with the bottom-wall inner surface 55 of the cup section 7, and thus the bottom-wall inner surface 55 of the cup section 7 is brought into a state of being received by the shaft member 57 (Step S3). That is, the bottom-wall inner surface 55 of the cup section 7 is brought into a state illustrated in the right half of the drawing sheet of FIG. 1. Thus, the opening end surface 51 of the cup section 7 and the bottom-wall inner surface 56 of the cup section 7 are brought into a simultaneous pressure receiving state. That is, the distal end surface of the shaft member 57 is brought into a state of projecting from the bottom surface (end-surface receiving surface 52) of the depressed portion 65 of the pedestal 53 by an amount corresponding to a depth dimension X ranging from the opening end surface 51 of the cup section 7 of the outer joint member 3 to the deepest portion of the bottom-wall inner surface 56 of the cup section 7.

In this state, an orbital forming process is started (Step S4). That is, under a state in which an axial center L1 of the punch member 50 is inclined at a predetermined angle with respect to an axial center L of the outer joint member 3 as illustrated in FIG. 2, the punch member 50 is pressed against the back surface 26a of the bottom wall 26 of the outer joint member 3, and the punch member 50 is rotated about the axial center L of the outer joint member 3. Thus, rocking motion is generated in the punch member 50, to thereby form the face spline 28 in the back surface 26a of the bottom wall 26. The outer joint member 3 having the face spline 28 thus formed therein is then finished through heat hardening treatment, grinding process, and the like. Note that, the inclination angle of the axial center L1 of the punch member 50 with respect to the axial center L of the outer joint member 3 is set to, for example, about 4° to 6°.

Figure 7:
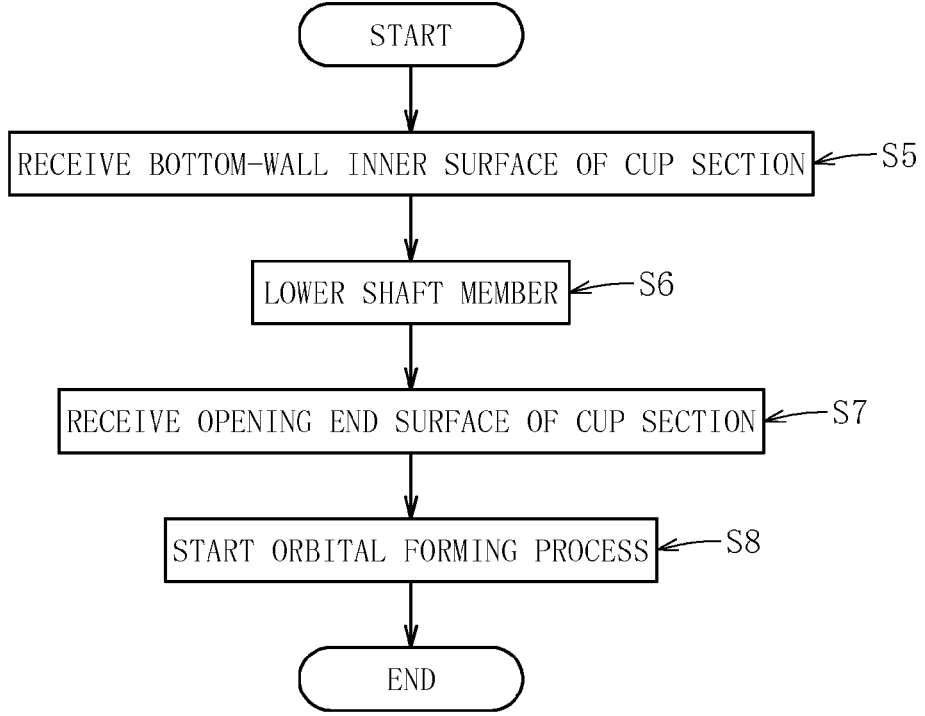
FIG. 7 is a flow chart of another face spline forming method using the face spline forming apparatus.

A method illustrated in the flow chart of FIG. 7 may also be employed as the face spline forming method using the face spline forming apparatus that is constructed as described above. In this case, the bottom-wall inner surface 55 of the cup section 7 is first brought into a state of being received by the inner-surface receiving surface 56 of the shaft member 57 (Step S5). That is, the distal end surface of the shaft member 57 is brought into a state of projecting from the bottom surface (end-surface receiving surface 52) of the depressed portion 65 of the pedestal 53 by an amount larger than the depth dimension X ranging from the opening end surface 51 of the cup section 7 of the outer joint member 3 to the deepest portion of the bottom-wall inner surface 56 of the cup section 7. In this state, a gap (not shown) is provided between the opening end surface 51 of the outer joint member 3 and the bottom surface (end-surface receiving surface 52) of the depressed portion 65 of the pedestal 53.

Subsequently, the shaft member 57 is lowered in the direction indicated by the arrow B (see FIG. 1) along the direction of the axial center thereof (Step S6). Then, the opening end surface 51 of the cup section 7 is brought into contact with the bottom surface (end-surface receiving surface) 52 of the depressed portion 65 of the pedestal 53, and thus the opening end surface 51 of the cup section 7 is brought into a state of being received by the end-surface receiving surface 52 of the pedestal 53 (Step S7). Thus, the opening end surface of the cup section 7 and the bottom-wall inner surface 56 of the cup section 7 are brought into a simultaneous pressure receiving state. In this state, the distal end surface of the shaft member 57 is brought into a state of projecting from the bottom surface (end-surface receiving surface 52) of the depressed portion 65 of the pedestal 53 by an amount corresponding to the depth dimension X ranging from the opening end surface 51 of the cup section 7 of the outer joint member 3 to the deepest portion of the bottom-wall inner surface 56 of the cup section 7. In this state, the orbital forming process is started (Step S8). Thus, the face spline can be formed in the back surface 26a of the bottom wall 26.

According to the face spline forming apparatus and the face spline forming method of the present invention, the pedestal 53 and the shaft member 57 are shifted relative to each other in the axial direction, and hence the opening end surface 51 of the cup section 7 and the bottom-wall inner surface 55 of the cup section 7 can receive a pressure simultaneously. Therefore, even when the axial dimension inside the cup section 7 fluctuates, the back surface 26a of the bottom wall can be plastically deformed by the tooth portion 62 of the punch member 50 under the simultaneous pressure receiving state, and as a result, the face spline 28 can be formed stably while suppressing the fluctuation of the inner diameter of the cup section 7. Note that, according to the face spline forming apparatus and the face spline forming method of the present invention, the amount of fluctuation of the inner diameter of the cup section 7 can be reduced to about 1/10 as compared to the case where the pressure is received only by the bottom-wall inner surface 55 of the cup section 7.

As long as the relative axial shift of the pedestal 53 and the shaft member 57 by the control means 71 is carried out through the axial movement of the shaft member 57, and the movement mechanism 70 for the axial movement of the shaft member 57 is constructed of a screw structure, the movement mechanism 70 can be constructed of a simple structure, and thus the cost can be reduced. Further, as long as the relative axial shift of the pedestal 53 and the shaft member 57 by the control means 71 is carried out through the axial movement of the shaft member, and the movement mechanism 70 for the axial movement of the shaft member 57 is constructed of a servomechanism using a servomotor, there are attained advantages of high accuracy with respect to the target value, a wide speed range, quick response, and the like.

Figure 8:
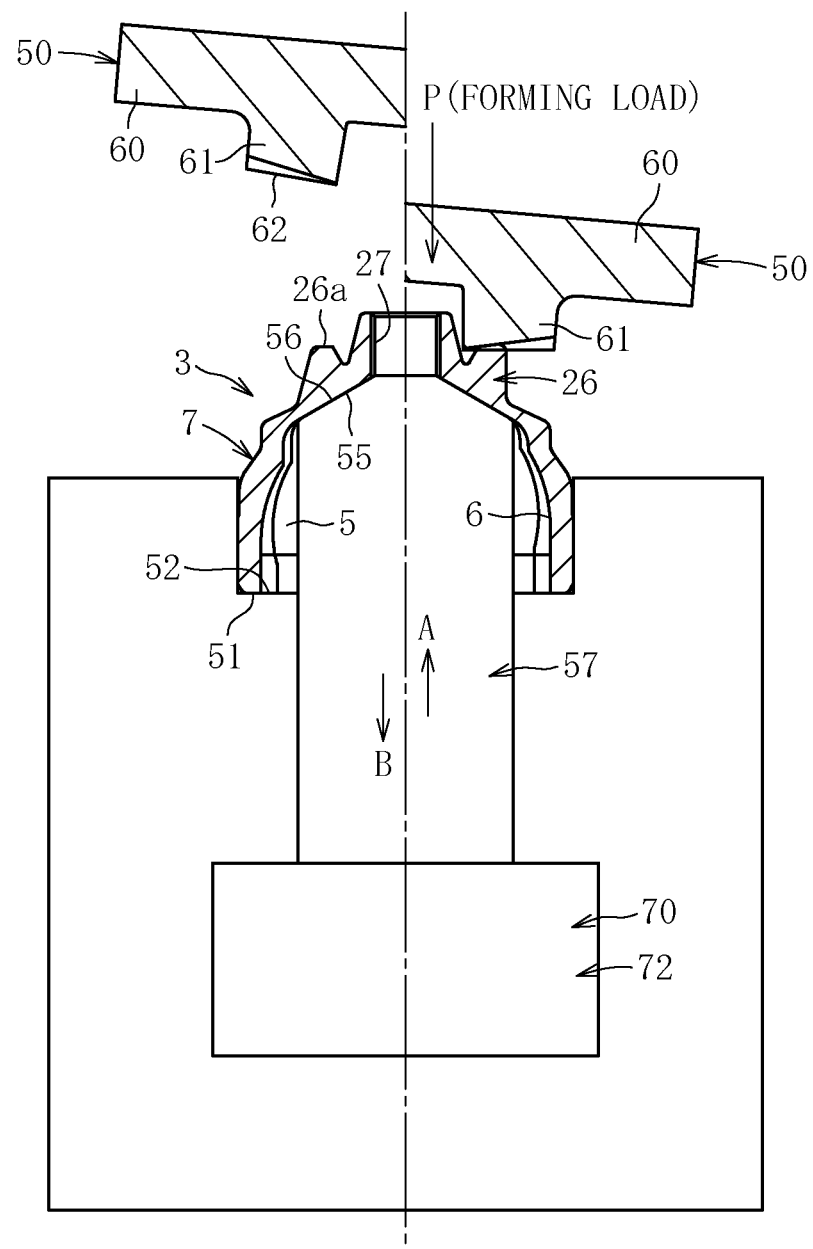
FIG. 8 is a sectional view of a face spline forming apparatus according to another embodiment of the present invention.

A face spline forming apparatus illustrated in FIG. 8 is capable of adjusting a load to be applied to the bottom-wall inner surface 56 of the cup section 7 at the time of the orbital forming process. That is, a hydraulic mechanism 72 is used as the movement mechanism 70 for vertically moving the shaft member 57.

Figure 9:
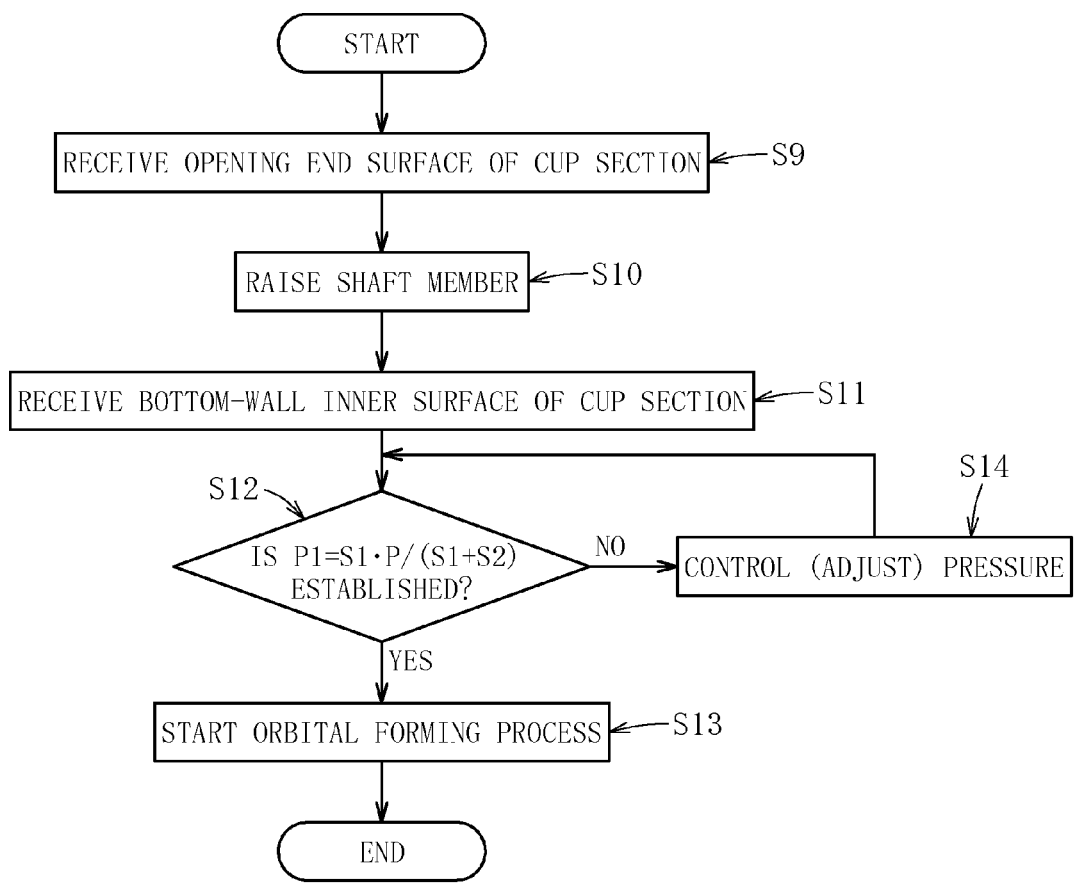
FIG. 9 is a flow chart of a face spline forming method using the face spline forming apparatus illustrated in FIG. 8.

Referring to the flow chart of FIG. 9, description is given of a face spline using the face spline forming apparatus as described above. First, as described in Step S9, the opening end surface 51 of the cup section 7 is brought into a state of being received by the end-surface receiving surface 52 of the pedestal 53. Subsequently, the process proceeds to Step S10, and the shaft member 57 is raised. Then, as described in Step S11, the bottom-wall inner surface 55 of the cup section 7 is brought into a state of being received by the inner-surface receiving surface 56 of the shaft member 57.

After that, the tooth portion 62 of the punch member 50 is pressed against the back surface 26a of the bottom wall 26 of the cup section 7, and as described in Step S12, it is determined whether or not $P1=S1 \cdot P/(S1+S2)$ is established. In this expression, S1 represents a pressure receiving area of the bottom-wall inner surface 55 of the cup section 7, S2 represents a pressure receiving area of the opening end surface 51 of the cup section 7, P represents a forming load at the time of plastic deformation, and P1 represents a load to be applied to the bottom-wall inner surface 55 of the cup section 7. Note that, the load P1 may be measured based on a pressing load of the hydraulic mechanism 72.

When $P1=S1 \cdot P/(S1+S2)$ is established in Step S12, the process proceeds to Step S13, and the orbital forming is started. When $P1=S1 \cdot P/(S1+S2)$ is not established in Step S12, on the other hand, the hydraulic mechanism 72 controls (adjusts) the pressure as the movement mechanism 70 to establish $P1=S1 \cdot P/(S1+S2)$. According to this method, the simultaneous pressure receiving state can be attained effectively, and thus the fluctuation of the inner diameter of the cup section 7 can be suppressed stably.

Figure 10:
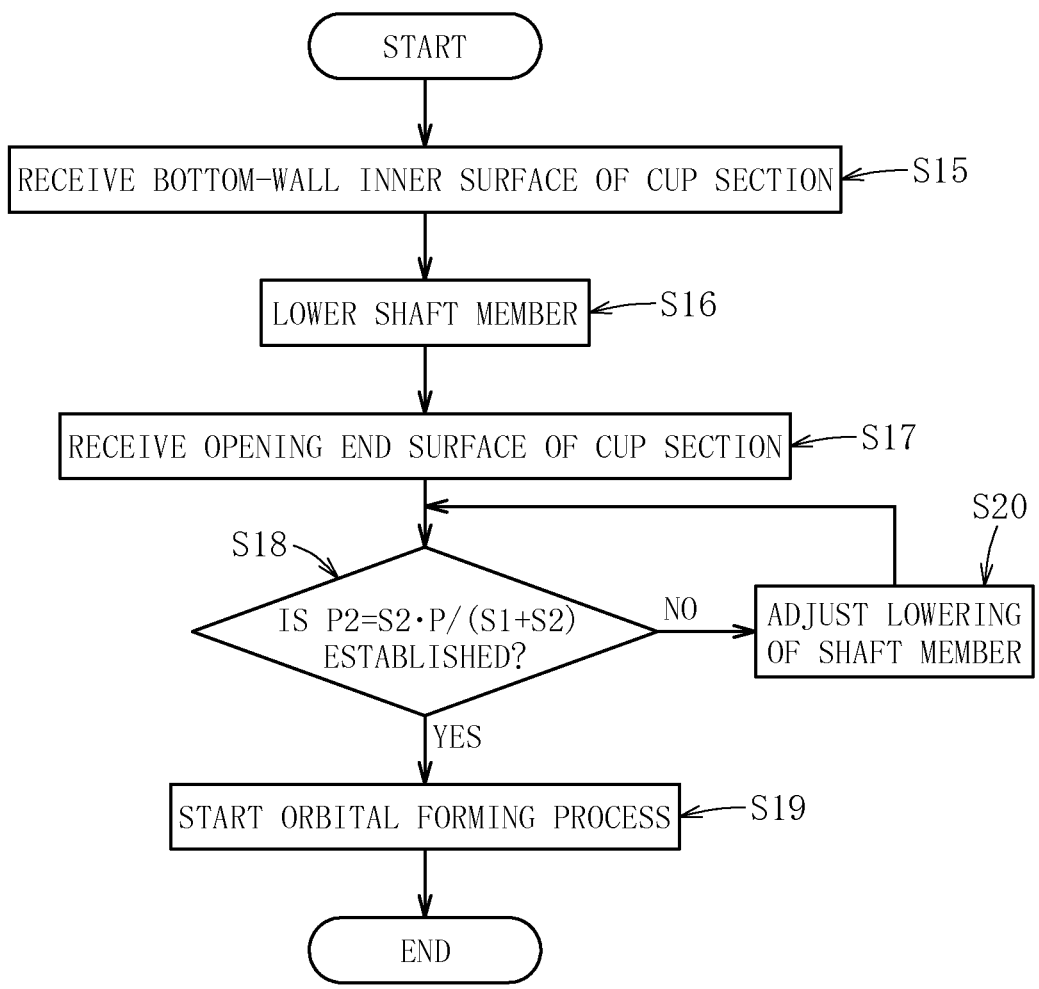
FIG. 10 is a flow chart of another face spline forming method using the face spline forming apparatus illustrated in FIG. 8.
Figure 11:
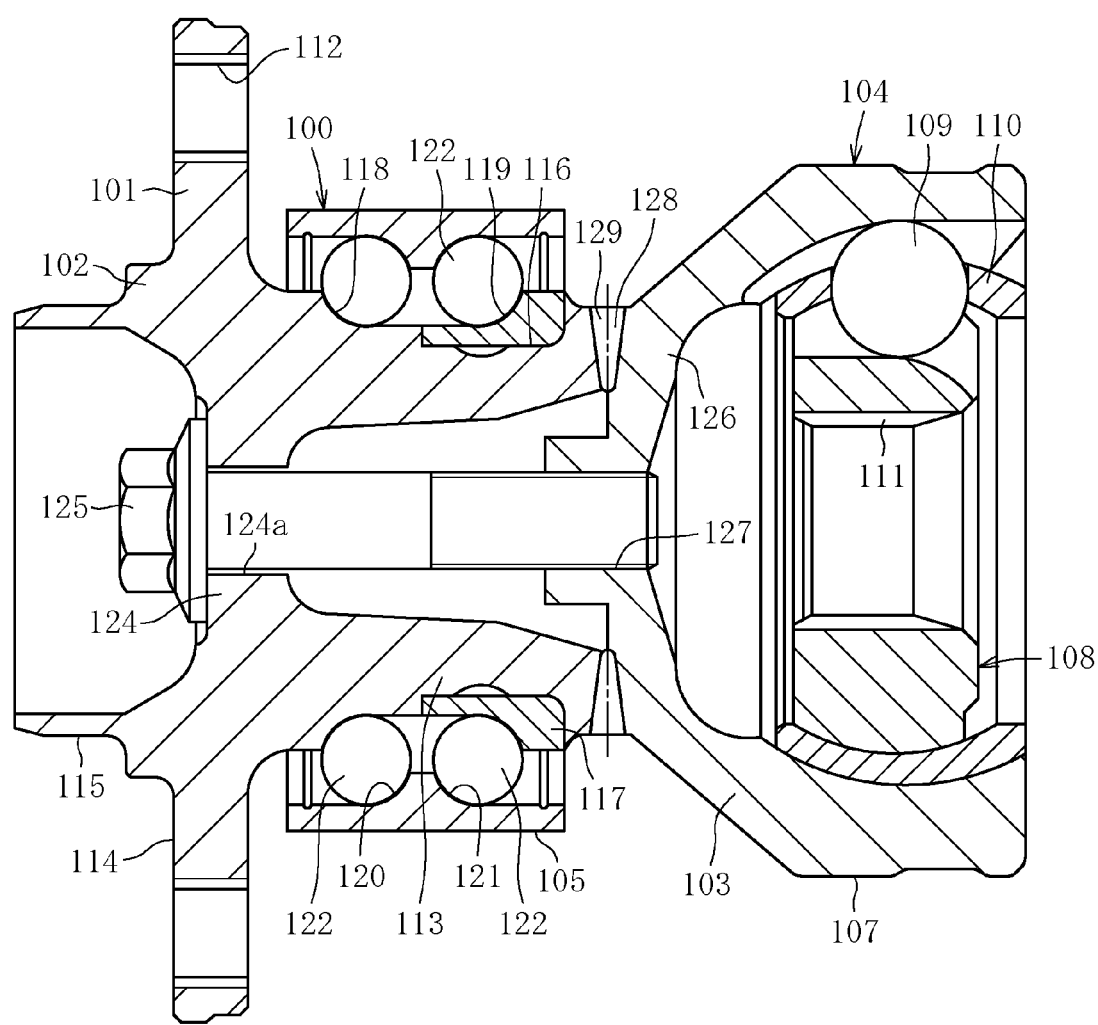
FIG. 11 is a sectional view of a wheel bearing device.

Further, the face spline forming apparatus illustrated in FIG. 8 may also form the face spline 28 by the following method illustrated in FIG. 10. First, the bottom-wall inner surface 55 of the cup section 7 is brought into a state of being received by the inner-surface receiving surface 56 of the shaft member 57 (Step S15). After that, the process proceeds to Step S16, and the shaft member 57 is lowered. Then, as described in Step S17, the opening end surface 51 of the cup section 7 is received.

After that, the tooth portion 62 of the punch member 50 is pressed against the back surface 26a of the bottom wall 26 of the cup section 7, and as described in Step S18, it is determined whether or not $P2=S2 \cdot P/(S1+S2)$ is established. In this expression, S1 represents a pressure receiving area of the bottom-wall inner surface 55 of the cup section 7, S2 represents a pressure receiving area of the opening end surface 51 of the cup section 7, P represents a forming load at the time of plastic deformation, and P2 represents a load to be applied to the opening end surface 51 of the cup section 7. Note that, the load P1 may be measured based on a pressing load of the hydraulic mechanism 72.

When $P2=S2 \cdot P/(S1+S2)$ is established in Step S18, the process proceeds to Step S19, and the orbital forming is started. When $P2=S2 \cdot P/(S1+S2)$ is not established in Step S18, on the other hand, the hydraulic mechanism controls (adjusts) the pressure as the movement mechanism to establish $P2=S2 \cdot P/(S1+S2)$. According to this method, the simultaneous pressure receiving state can be attained effectively, and thus the fluctuation of the inner diameter of the cup section 7 can be suppressed stably.

Also in the case where the face spline 28 is formed by the face spline forming apparatus illustrated in FIG. 8 (formed in accordance with the flowcharts of FIG. 9 and FIG. 10), similarly to the case where the face spline 28 is formed by the face spline forming apparatus illustrated in FIG. 1 (formed in accordance with the flow charts of FIG. 6 and FIG. 7), the amount of fluctuation of the inner diameter of the cup section 7 can be reduced to about 1/10 as compared to the case where the pressure is received only by the bottom-wall inner surface 55 of the cup section 7.

The outer joint member 3 having the face spline 28 formed therein by the face spline forming apparatus and the face spline forming method described above is a high-quality outer joint member with a small fluctuation of the inner diameter of the cup section. Further, the constant velocity universal joint using the outer joint member 3 as described above is a constant velocity universal joint that can effectively take advantage of the face spline structure.

The embodiments of the present invention have been describe above, but the present invention is not limited to those embodiments, and various modifications may be made thereto. For example, when constructing a constant velocity universal joint through use of the outer joint member according to the present invention, the constant velocity universal joint may be a fixed type constant velocity universal joint such as an undercut free type constant velocity universal joint and a Birfield type constant velocity universal joint, or may be a plunging type constant velocity universal joint such as a tripod type constant velocity universal joint, a double offset type constant velocity universal joint, and a cross groove type constant velocity universal joint.

INDUSTRIAL APPLICABILITY

The present invention is applicable to a wheel bearing device comprising a hub wheel, a double row rolling bearing, and a constant velocity universal joint that are provided as a unit. In this case, a face spline can be formed in a bottom-wall back surface of an outer joint member of the constant velocity universal joint of the wheel bearing device.

REFERENCE SIGNS LIST 3 outer joint member
4 constant velocity universal joint
26a back surface
26 bottom wall
28 face spline
50 punch member
51 opening end surface
52 end-surface receiving surface
53 pedestal
55 bottom-wall inner surface
56 inner-surface receiving surface
57 shaft member
62 tooth portion
70 movement mechanism
71 control means

The invention claimed is:

1. A face spline forming apparatus for forming a face spline in a bottom-wall back surface of an outer joint member of a constant velocity universal joint, the face spline forming apparatus comprising:
a punch member having a tooth portion for forming the face spline, and having an axial center inclined at a predetermined angle with respect to an axial center of the outer joint member;
a pedestal having an end-surface receiving surface for receiving an opening end surface of a cup section of the outer joint member;
a shaft member having an inner-surface receiving surface for receiving a bottom-wall inner surface of the cup section of the outer joint member;
a movement mechanism for shifting the pedestal and the shaft member relative to each other in an axial direction thereof; and
control means for controlling the movement mechanism so that a pressure is simultaneously receivable by the opening end surface of the cup section and the bottom-wall inner surface of the cup section,
wherein the end-surface receiving surface of the pedestal receives a portion of the opening end surface of the cup section of the outer joint member that is furthest away from the bottom-wall back surface in the axial direction,
wherein the bottom-wall inner surface of the cup section of the outer joint member comprises an inner-surface tapered portion,
wherein the inner-surface receiving surface of the shaft member comprises a receiving-surface tapered portion that receives the inner-surface tapered portion,
wherein one of the end-surface receiving surface of the pedestal receiving the opening end surface of the cup section and the inner-surface receiving surface of the shaft member receiving the bottom-wall inner surface of the cup section occurs first, and the other of the end-surface receiving surface of the pedestal receiving the opening end surface of the cup section and the inner-surface receiving surface of the shaft member receiving the bottom-wall inner surface of the cup section subsequently occurs to attain a simultaneous pressure receiving state of the opening end surface of the cup section and the bottom-wall inner surface of the cup section, and
wherein, at the time of receiving the pressure simultaneously, the punch member is configured to perform a rocking motion through rotation of the punch member about the axial center of the outer joint member, to thereby form the face spline in the bottom-wall back surface due to plastic deformation caused by the tooth portion of the punch member.

2. A face spline forming apparatus according to claim 1, wherein the pedestal and the shaft member are configured to shift relative to each other in the axial direction through movement of the shaft member in the axial direction.

3. A face spline forming apparatus according to claim 1, wherein the movement mechanism comprises a screw structure.

4. A face spline forming apparatus according to claim 1, wherein the movement mechanism comprises a servo-mechanism using a servomotor.

5. A face spline forming apparatus according to claim 2, wherein the movement mechanism comprises a screw structure.

6. A face spline forming apparatus according to claim 2, wherein the movement mechanism comprises a servo-mechanism using a servomotor.

* * * * *